United States Patent [19]

Fodor

[11] 4,237,029
[45] Dec. 2, 1980

[54] CATALYST COMPRISING INTENSELY MIXED TRIARYL PHOSPHITE, ALUMINUM TRIHALIDE, TITANIUM TRIHALIDE COMPONENT

[75] Inventor: Lawrence M. Fodor, Bartlesville, Okla.

[73] Assignee: Phillips Petroleum Company, Bartlesville, Okla.

[21] Appl. No.: 7,454

[22] Filed: Jan. 29, 1979

[51] Int. Cl.$^3$ ............................................. C08F 4/64
[52] U.S. Cl. .............................. 252/429 B; 526/139; 526/158
[58] Field of Search ................... 252/429 B, 429 C

[56] References Cited

U.S. PATENT DOCUMENTS

| | | | |
|---|---|---|---|
| 2,970,133 | 1/1961 | Sistrunk | 526/154 |
| 3,032,510 | 5/1962 | Tornquist et al. | 252/429 C |
| 3,094,568 | 6/1963 | Hay et al. | 252/429 B X |
| 3,298,965 | 1/1967 | Tornquist | 252/429 A |
| 3,502,634 | 3/1970 | Stedefeder et al. | 526/139 |
| 3,923,687 | 12/1975 | Shirai et al. | 252/429 C |
| 3,977,997 | 8/1976 | Shick et al. | 252/429 D |
| 4,028,481 | 6/1977 | Shiomura et al. | 252/429 B X |
| 4,048,415 | 9/1977 | Matsuzawa et al. | 252/429 B X |

FOREIGN PATENT DOCUMENTS 895595  5/1962  United Kingdom ............... 252/429 C

*Primary Examiner*—Patrick Garvin

[57] ABSTRACT

A catalyst system is made up of a catalyst and a cocatalyst. The catalyst component is made by intensely mixing a titanium trihalide component with triaryl phosphite and aluminum trihalide adjuvants. The cocatalyst is an organoaluminum compound. An example of such a system is a ball milled mixture of $TiCl_3 \cdot 1/3 AlCl_3$, triphenyl phosphite, and aluminum trichloride as the catalyst and diethylaluminum chloride as the cocatalyst. Such catalyst systems give both high productivity and low solubles in the polymerization of propylene. The catalytic activity and/or stereospecificity of the catalyst can be enhanced by heat treatment at a moderate temperature subsequent to milling the mixture.

18 Claims, No Drawings

CATALYST COMPRISING INTENSELY MIXED TRIARYL PHOSPHITE, ALUMINUM TRIHALIDE, TITANIUM TRIHALIDE COMPONENT

BACKGROUND OF THE INVENTION

This invention relates to titanium trichloride catalyst systems. It is broadly known to utilize titanium trichloride, or even titanium tetrachloride, as a polymerization catalyst for olefins. Such catalysts, however, tend, particularly in the polymerization of propylene, to produce a high proportion of material which is soluble in solvents such as normal hexane. It has been found that the solubles formation can be suppressed by the use of various adjuvants such as those discosed in German Pat. No. 2,347,577. Unfortunately, it has been found that suppression of solubles formation also generally depresses the overall production of polymer.

It is therefore an object of this invention to polymerize olefins, particularly propylene, at high productivity rates without the formation of substantial amounts of soluble materials. It is another object of this invention to provide an improved catalyst for polymerization of olefins such as propylene. It is still another object of this invention to provide an improved process for producing titanium trichloride catalyst systems.

Other aspects, objects and the various advantages of this invention will become apparent upon reading this specification and the appended claims.

STATEMENT OF THE INVENTION

In accordance with this invention, a titanium trihalide is intensively mixed with aluminum trihalide and triaryl phosphite adjuvants to produce a first catalyst component which is then combined with an organoaluminum cocatalyst component.

The catalyst system of this invention requires the intensive mixing, as by ball milling, of the compounds of the catalyst component. This intensive mixing is essential to the invention.

In an embodiment of this invention, the milled, dry catalysts are given a heat treatment at a moderate temperature, e.g., about 50° to about 120° C., with the time ranging from about 0.1 to about 10 hours to further increase their catalytic activity and/or stereospecificity. Generally, as the temperatures increase, the treating time is decreased.

The titanium component of the catalyst is a titanium trihalide, particularly titanium trichloride because of its availability and relative low cost. A presently preferred form of titanium trichloride because of its good polymerization activity, is an aluminum reduced titanium tetrachloride having the approximate formula $TiCl_3 \cdot \frac{1}{3}AlCl_3$. Even more preferable as a starting material for producing the catalyst of this invention is a $TiCl_3 \cdot \frac{1}{3}AlCl_3$ that has been ball milled. Such treatment results in an enhanced polymerization activity. For convenience, $TiCl_3 \cdot \frac{1}{3}AlCl_3$, hereafter, is designated as $TiCl_3AA$.

One of the adjuvants is a triaryl phosphite generically shown as $(RO)_3P$ where R is aryl, alkyl-substituted aryl, cycloalkyl substituted aryl and aryl-substituted aryl wherein the basic unsubstituted aryl contains 6–14 carbon atoms and the alkyl, cycloalkyl and aryl substituents have 1 to about 10 carbon atoms. At present, triphenyl phosphite (TPP) is preferred because of ready availability and relatively low cost. Other suitable phosphites are tri-1-naphthyl phosphite, tri-9-anthryl phosphite, tri-4-phenanthryl phosphite, tri-o-tolyl phosphite, tri-p-cumenyl phosphite, tris(4-pentyl-1-naphthyl) phosphite, tris(3-heptyl-1-anthryl) phosphite, tris(5-decyl-2-phenanthryl) phosphite, tris(3-cyclobutylphenyl) phosphite, tris(6-cycloheptyl-2-naphthyl) phosphite, tris(10-cyclodecyl-9-anthryl) phosphite, tris(3-cyclopentylphenyl) phosphite, tris[4-(2-naphthyl)phenyl] phosphite, tris(7-phenyl-1-naphthyl) phosphite, tris(6-phenyl-2-anthryl) phosphite, tris(7-phenyl-1-phenanthryl) phosphite, and the like.

The second adjuvant is an anhydrous trihalide of aluminum, e.g., $AlX_3$ where X is bromide, chloride, fluoride, iodide and mixtures thereof. Presently preferred because of availability and relatively low cost is aluminum trichloride.

The $TiCl_3AA$ and adjuvants are intensively mixed together for about 0.5–100 hours, more preferably from about 10–30 hours, at ambient conditions by means of a ball mill, rod mill, vibrating mill and the like. Cooling of the mill can be employed, if desired, to keep the temperature of the milling material within a specified temperature range, e.g. 25°–75° C. An atmosphere, inert in the process, such as nitrogen, argon, etc., can be employed in the milling vessel.

Organoaluminum compounds, $R_n'AlX_{3-n}$ in which R' is a hydrocarbon group containing from 1 to about 20 carbon atoms, X is a halogen atom and n is an integer of 1 to 3, are used as cocatalysts in combination with the invention catalysts. Exemplary compounds include triethylaluminum, diethylaluminum chloride, diisobutylaluminum bromide, n-octylaluminum sesquichloride, eicosylaluminum dichloride, and the like and mixtures. Diethylaluminum chloride (DEAC) is a presently preferred cocatalyst since it complements the catalyst well and good polymer production along with low soluble polymer formation is favored.

The mole ratio of $TiCl_3AA$ to triaryl phosphite can range from about 4:1 to 25:1. The mole ratio of $TiCl_3AA$ to aluminum trihalide can range from about 1.5:1 to 11:1. The mole ratio of aluminum trihalide:triaryl phosphite employed is generally about 2.3:1. However, it can range from about 0.5:1 to 10:1. The mole ratio of organoaluminum compound:$TiCl_3AA$ generally ranges from about 1:1 to 100:1.

The amount of catalyst employed in 1 liter of reactants; catalyst, cocatalyst, hydrogen and liquid propylene, generally ranges from about 0.01 to 0.1 gram.

Conventional batch or continuous polymerization processes can be utilized with the catalysts of this invention. For example, polymerization can be accomplished in the presence of a diluent inert in the process, e.g., a paraffinic hydrocarbon, or in the absence of a diluent when polymerization is effected in the presence of liquid monomer which is presently preferred when propylene is polymerized. Molecular weight control of the polymeric product is accomplished by the use of hydrogen as is well known to those skilled in the art.

The pressure in the process can vary from about atmospheric or higher. Pressures ranging from 50 to about 600 psig (344–4130 kPa) or higher are conveniently employed.

The reactor temperature can vary from about 0° to 200° C. For propylene polymerization, temperatures of from about 60° to 100° C., preferably from about 70° to 90° C. are used.

The catalyst system of this invention can be utilized for the polymerization of at least one mono-1-olefin having 2 to 8 carbon atoms per molecule. It is of particular applicability to the polymerization of propylene at high rates with low solubles utilizing diethylaluminum chloride as the cocatalyst. It is also useful for polymerization of ethylene preferably using a trialkylaluminum as the cocatalyst. It is also useful for copolymerization of ethylene with minor amounts of higher 1-olefins such as propylene, butene, or 1-hexane again utilizing preferably the trialkylaluminum as the cocatalyst.

EXAMPLE 1

A: Control catalyst preparation

Unless specified otherwise, each catalyst was prepared by charging each component, with liquids, last, to a steel milling vessel containing steel balls, under a dry nitrogen purge. After sealing the vessel, it was attached to the mill and agitated a specific length of time at ambient conditions. When cooling was utilized, a stream of tap water at the prevailing seasonal temperature was directed onto the agitated vessel.

The milling was performed in spherical steel vessels of either 250 ml or 1000 ml volume which were agitated on a vibratory mill having a frequency of 1760 cycles/minute and an amplitude of ⅜-inch (0.95 cm.). The ball charge varied from 200–400 g. in the small vessel and from 1000–2500 g. in the large vessel. A ball diameter of ⅜ inch was employed in each vessel unless indicated to the contrary.

When catalysts were heat treated following the milling process, the vessels containing them were detached from the mill and placed in an oven for the desired period of time. The vessels were cooled to about room temperature and in a nitrogen atmosphere, each vessel was opened and the contents were poured onto a coarse screen to retain the balls. The powdered product was recovered by passing it through a 60 mesh screen (U.S. Sieve series) and stored in dry, stoppered flasks in a dry, nitrogen atmosphere.

The catalyst components and weights employed, vessel size and ball charge used, milling times, and cooling, if employed, are given in Table 1A.

B: Propylene polymerization

Polymerization of propylene was carried out in a 1 liter, stirred, stainless steel reactor. In each run, the reactor was conditioned by filling it with dry n-hexane containing about 5 ml of a 25 wt% solution of DEAC in n-hexane and heating the reactor to 135° C. for 1 hour. Heating was discontinued, the reactor contents were dumped and the reactor was flushed with dry nitrogen. While maintaining a nitrogen purge, the catalyst and cocatalyst, in that order, were charged to the reactor through an entry port, the port was sealed and ¼ liter of hydrogen was added. The reactor was then filled about ⅔ full with liquid propylene and heating was started. After reaching the desired reaction temperature, the reactor was filled liquid full with propylene and maintained in that condition throughout the run by means of a propylene reservoir open to the reactor pressured to 500 psig (3.5 MPa) with dry nitrogen. Each run was terminated by venting unreacted propylene. The polymer was recovered, washed with methanol, antioxidant was added, and the polymer dried in a vaccum oven.

Since propylene-soluble polymer was not separated from the propylene-insoluble polymer, the soluble polymer results reported are total soluble polymer formed, e.g., propylene-soluble polymer plus xylene-soluble polymer.

The calculated productivity figures reported in each run are given in terms of grams polymer produced per gram calculated and in terms of grams polymer per grams total catalyst employed.

The quantities of reactants employed, calculated quantities determined, reactor temperatures used and results obtained for each 1 hour polymerization run are presented in Table 1B.

TABLE 1A

| | | Control Catalysts Preparation | | | | | | | | | |
|---|---|---|---|---|---|---|---|---|---|---|---|
| Catalyst No. | Milling Vessel size ml | Steel Balls size inches | Steel Balls total weight | Cooling | Milling Time hours | Catalyst Components, g TiCl₃AA | Catalyst Components, g AlCl₃ | Catalyst Components, g TPP | Mole Ratios TiCl₃AA / AlCl₃ | Mole Ratios TiCl₃AA / TTP | Mole Ratios AlCl₃ / TPP |
| A | 250 | ⅜ | 300 | yes | 22.5 | 1.0 | 0 | 0 | na(a) | na | na |
| B | 1000 | " | 2500 | " | 18.1 | 38 | 0 | 12 | na | 4.2 | na |
| C | " | ¼ | 2000 | " | 17.3 | 42.5 | 0 | 7.5 | na | 7.6 | na |
| D | 250 | ⅜ | 300 | no | 16.9 | 10.2 | 0 | 1.8 | na | 7.3 | na |
| E | " | " | " | yes(b) | 20.9 | 8.5 | 0 | 1.5 | na | 7.2 | na |
| F | " | " | 400 | no | 21.9 | 7.0 | 3.0 | 0 | 1.3 | na | na |
| G | " | " | " | " | 21.9 | 8.5 | 1.5 | 0 | 3.3 | na | na |

Notes:
(a)Not applicable
(b)After milling, vessel and contents heated for 2 hours at 120°.

TABLE 1B

| | | | Propylene Polymerization With Control Catalysts | | | | | | |
|---|---|---|---|---|---|---|---|---|---|
| Run No. | Catalyst Number | Reactor Temp, °C. | Catalyst Charged Total g | Catalyst Charged Calculated TiCl₃AA g | Catalyst Charged mmoles | Calculated Mole Ratio DEAC/TiCl₃AA | Polymer Yield g | Soluble Polymer wt % | Calculated Productivity Total(a) Catalyst | Calculated Productivity Calculated(b) TiCl₃AA |
| 1 | A | 71 | 0.0343 | — | 0.146 | 22 | 65.3 | 17.7 | 1900 | 1900 |
| 2 | A | 79 | 0.0253 | — | 0.108 | 29 | 58.3 | 21.4 | 2300 | 2300 |
| 3 | Aᶜ | 79 | 0.0376 | — | 0.161 | 20 | 67.0 | 14.5 | 1780 | 1780 |
| 4 | Aᵈ | 79 | 0.0478 | — | 0.204 | 16 | 73.5 | 7.5 | 1540 | 1540 |
| 5 | B | 71 | 0.0416 | 0.0316 | 0.135 | 24 | 14.1 | 9.5 | 339 | 446 |
| 6 | C | 71 | 0.0333 | 0.0283 | 0.121 | 26 | 33.7 | 5.8 | 1010 | 1190 |
| 7 | D | 71 | 0.0304 | 0.0258 | 0.110 | 29 | 35.9 | 11.5 | 1180 | 1390 |
| 8 | E | 71 | 0.0367 | 0.0312 | 0.133 | 24 | 38.6 | 4.0 | 1050 | 1240 |
| 9 | F | 71 | 0.0757 | 0.0530 | 0.226 | 14 | 79.9 | 10.8 | 1060 | 1510 |

TABLE 1B-continued

| | | | Catalyst Charged | | | Calculated | Polymer | Soluble | Calculated Productivity | |
|---|---|---|---|---|---|---|---|---|---|---|
| Run No. | Catalyst Number | Reactor Temp, °C. | Total g | Calculated TiCl₃AA | | Mole Ratio DEAC/TiCl₃AA | Yield g | Polymer wt % | Total[a] Catalyst | Calculated[b] TiCl₃AA |
| | | | | g | mmoles | | | | | |
| 10 | G | 71 | 0.0412 | 0.0350 | 0.150 | 21 | 68.5 | 14.2 | 1660 | 1960 |

Notes:
[a]g polymer per g total catalyst charged.
[b]g polymer per g calculated TiCl₃AA contained in total catalyst.
[c]TPP added to reactor - amount added-15 mole % based on TiCl₃AA charged, TiCl₃AA to TPP mole ratio is 5.7:1.
[d]TPP added to reactor - amount added-30 mole % based on TiCl₃AA charged, TiCl₃AA to TPP mole ratio is 2.3:1.

Inspection of results given in Table 1B, runs 1 and 2, shows typical productivity values for polypropylene made in the presence of unmodified TiCl₃AA catalyst and DEAC cocatalyst. Productivity is somewhat enhanced by going to a reactor temperature of 79° C. from 71° C., 2300 g polymer/g TiCl₃ vs. 1900 g/g, but soluble polymer is increased from 17.7 wt% at 71° C. to 21.4 wt% at 79° C. The results in runs 3 and 4 show that soluble polymer formation can be reduced by adding TPP as a reactor adjuvant, if a sufficient quantity is present. Thus, in run 4, 46.6 wt% TPP is separately charged to the reactor based on the TiCl₃AA charged and the results show a productivity figure of 1540 g/g and soluble polymer is reduced to 7.5 wt%. Such quantities of TPP are excessive from a cost standpoint and from a separation standpoint since recovery and purifications of propylene for recycle is thereby complicated. Nevertheless, these values are considered to be benchmarks. Thus, invention catalysts are those which exceed about 1550 g/g productivity and/or produce soluble polymer of less than about 7.5 wt%.

The effects of ball milling TPP with TiCl₃AA to form a modified catalyst are shown in runs 5-8. Thus, soluble polymer can be reduced to about 4wt% at a productivity value of about 1200 as the run 8 results show if the catalyst is heat treated after milling. These results show a favorable soluble polymer level but polymer production is reduced to an undesirable level. Run 10 shows that AlCl₃ milled with TiCl₃AA to give a TiCl₃AA/AlCl₃ mole ratio of 3.3:1 yields a catalyst about equal in productivity and soluble polymer formation to an unmodified catalyst. Run 9 shows that a TiCl₃AA/AlCl₃ mole ratio of 1.3:1 gives a catalyst which reduced productivity and soluble polymer formation as compared to run 10.

TABLE 2 propylene Polymerization With Milled Catalysts Containing TiCl₃AA, AlCl₃ and Triphenyl Phosphite

| | Catalyst Composition Mole Ratios | | | Mill Temp. Hours | Catalyst Charged | | | Reactor Temp. °C. | Mole Ratio DEAC TiCl₃AA | Polymer Yield g | Soluble Polymer wt % | Calculated Productivity, g | |
|---|---|---|---|---|---|---|---|---|---|---|---|---|---|
| Run No. | TiCl₃AA AlCl₃ | TiCl₃AA TPP | AlCl₃ TPP | | Total g | Calculated TiCl₃AA | | | | | | Total Catalyst | Calculated TiCl₃AA |
| | | | | | | g | mmoles | | | | | | |
| 11 | 10 | 24 | 2.3 | 16.5 | 0.0426 | 0.0383 | 0.164 | 71 | 19 | 58.3 | 5.6 | 1370 | 1520 |
| 12 | 4.6 | 11 | " | 16.6 | 0.0467 | 0.0374 | 0.160 | " | 20 | 57.8 | 7.4 | 1240 | 1550 |
| 13 | 3.4 | 7.9 | " | 19.3 | 0.0416 | 0.0312 | 0.133 | " | 24 | 49.8 | 5.3 | 1200 | 1600 |
| 14 | 2.6 | 6.2 | " | 16.6 | 0.0385 | 0.0270 | 0.115 | " | 28 | 43.0 | 6.0 | 1120 | 1590 |
| 15 | 2.1 | 4.9 | " | 16.5 | 0.0531 | 0.0345 | 0.147 | " | 22 | 44.1 | 3.0 | 831 | 1280[g] |
| 16 | 1.7 | 4.0 | " | 21.8 | 0.0581 | 0.0349 | 0.149 | " | 21 | 44.2 | 3.9 | 761 | 1270[g] |
| 17 | 3.4 | 7.9 | " | 18.5 | 0.0370 | 0.0278 | 0.119 | 66 | 27 | 38.5 | 5.1[a] | 1000[b] | 1330[c] |
| | | | | | 0.0240 | 0.0180 | 0.077 | 66 | 41 | 23.1 | | | |
| 18 | " | " | " | " | 0.0295 | 0.0221 | 0.094 | 68 | 34 | 30.8 | 4.2 | 1040 | 1390 |
| 19 | " | " | " | " | 0.0294 | 0.0221 | 0.094 | 71 | 34 | 35.1 | 6.6[d] | 1180[e] | 1580[f] |
| | | | | | 0.0318 | 0.0239 | 0.102 | 71 | 31 | 37.3 | | | |
| 20 | " | " | " | " | 0.0367 | 0.0275 | 0.117 | 79 | 27 | 60.8 | 10.9 | 1660 | 2210 |
| 21 | 4.6 | 11 | " | 18.5 | 0.0439 | 0.0351 | 0.150 | 79 | 21 | 73.1 | 16.9 | 1670 | 2080 |
| 22 | 3.0 | 21 | 7.0 | 22.5 | 0.0274 | 0.0219 | 0.093 | 79 | 34 | 53.1 | 14.2 | 1940 | 2420 |
| 23 | 4.8 | 23 | 4.7 | 18.5 | 0.0508 | 0.0432 | 0.184 | 79 | 17 | 72.8 | 15.1 | 1430 | 1690 |

Notes:
[a]Average of 5.7 and 4.5 determined for each run.
[b]Average of 1040 and 963 calculated for each run.
[c]Average of 1380 and 1280 calculated for each run.
[d]Average of 5.8, 7.9 and 6.0 obtained in three determinations.
[e]Average of 1190 and 1170 for each run.
[f]Average of 1590 and 1560 calculated for each run.
[g]400 g of ⅜-inch balls used in milling the catalysts.

The catalysts in runs 11-16 were made with TiCl₃AA contents ranging from 90 to 60 wt%, the remaining portions containing equal weights of AlCl₃ and TPP, the total amounting to 10-40 wt%. The data show, considering soluble polymer formation and productivity values based on calculated TiCl₃AA content, that the most favorable catalyst combinations contain from about 70-90 weight % TiCl₃AA. This corresponds to mole ratios of TiCl₃AA/AlCl₃ of 2.6:1 to 10.2:1, TiCl₃AA/TPP of 6.2:1 to 24:1 and AlCl₃TPP of 2.3:1. In that range, soluble polymer made varies from about 5-7 wt% and productivity varies from about 1500-1600 g/g. These results are equal to or better than those obtained in run 4 of Example 1 which employs TiCl₃AA as the catalyst along with 30 mole % TPP added as a separate stream to the reactor. The results of runs 15,16 show that when the mole ratios TiCl₃AA/AlCl₃ are about 2:1 or less and TiCl₃AA/TPP are about 4:1 or less productivity starts to decline although less soluble polymer is produced. This indicates, as a lower limit, that the modified catalysts should contain at least about 60 wt% TiCl₃AA/TPP which corresponds to mole ratios of TiCl₃AA/AlCl₃ of 1.7:1 and TiCl₃AA/TPP of 4.0:1. Runs 17-20 were made employing the same catalyst at various reactor temperatures. The results suggest that a reactor temperature of about 70° C. provides the best results with the invention catalysts based on good productivity and/or reduced soluble polymer formation.

The results of runs 21-23 show that active catalysts can be made employing various mole ratios of AlCl₃ and TPP.

Example 3

Modified catalysts containing 65 and 75 wt% TiCl₃AA with the remainder consisting of equal weights of AlCl₃ and TPP were prepared by milling 10 g mixtures in a 250 ml vessel as before.

In terms of mole ratios, the catalyst consisting of 65 wt% TiCl₃AA and 17.5 wt% of AlCl₃ and TPP corresponds to TiCl₃AA/AlCl₃ of 2.1:1, TiCl₃AA/TPP of 4.9:1 and AlCl₃/TPP of 2.3:1. The catalyst consisting of 75 wt% TiCl₃AA and 12.5 wt% each of AlCl₃ and TPP corresponds to TiCl₃AA/AlCl₃ of 3.4:1, TiCl₃AA/TPP of 7.9:1 and AlCl₃/TPP of 2.3:1.

Milling times ranged from 18.8-25.2 hours, and either 300 or 400 g of ⅜-inch steel balls were employed. Mill cooling was used in each preparation. Each milled catalyst was heat treated, cooled and recovered in the manner described previously.

Propylene was polymerized at 71° C. and the polymer recovered in the process used before. The quantities of reactants employed, calculated values determined, catalyst heat treating conditions used and results obtained are given in Table 3.

conditions based on productivity and soluble polymer are shown in run 25. That catalyst received 30 minutes of heating at 120° C. Reducing the heat treating temperature to 95° C. and increasing the heat treating time to about 1 hour is shown in the productivity and soluble polymer results of run 30 to be most beneficial for the invention catalyst consisting of 75 wt% TiCl₃AA and 12.5 wt% each AlCl₃ and TPP. The good results obtained in runs 32-34 in terms of productivity and low soluble polymer demonstrate that heat treating an invention catalyst consisting of 65 wt% TiCl₃AA and 17.5 wt% each of AlCl₃ and TPP for about 1 hour is desirable also.

Example 4

Modified catalysts containing 70 and 75 wt% TiCl₃AA with the remainder consisting of equal weights of AlCl₃ and TPP were prepared by milling 10 g mixtures in a 250 ml vessel containing 400 g of ⅜-inch steel balls as before.

The mole ratios corresponding to 70 wt% TiCl₃AA and 15 wt% each AlCl₃ and TPP are: TiCl₃AA/AlCl₃ of 2.6:1, TiCl₃AA/TPP of 6.2:1 and AlCl₃/TPP of 2.3:1. The mole ratios corresponding to 75 wt% TiCl₃AA and 12.5 wt% each of AlCl₃ and TPP are: TiCl₃AA/AlCl₃ of 3.4:1, TiCl₃AA/TPP of 7.9:1 and AlCl₃/TPP of 2.3:1.

Mill cooling was not employed. Each milled sample was heat treated for 1 hour at 95° C., cooled and recovered as before. The effects of ball milling TiCl₃AA alone before milling it with AlCl₃/TPP and length of time spent in ball milling the modified catalysts based on the results obtained in propylene polymerization were determined.

TABLE 3

Propylene Polymerization With Heat Treated Catalysts

| | Catalyst Composition Mole Ratios | | | Heat Treating After Milling | | Catalyst Charged | | | Mole Ratio | Polymer | Soluble | Calculated Productivity, g | |
|---|---|---|---|---|---|---|---|---|---|---|---|---|---|
| Run No. | TiCl₃AA/AlCl₃ | TiCl₃AA/TPP | AlCl₃/TPP | hours | °C. | Total g | Calculated TiCl₃AA g | mmoles | DEAC/TiCl₃AA | Yield g | Polymer wt% | Total Catalyst | Calculated TiCl₃AA |
| 24 | 3.4 | 7.9 | 2.3 | 0 | — | 0.0357 | 0.0268 | 0.114 | 28 | 45.1 | 7.6 | 1260 | 1680 |
| 25 | " | " | " | 0.5 | 120 | 0.0387 | 0.0291 | 0.121 | 26 | 58.2 | 6.2 | 1500 | 2000 |
| 26 | " | " | " | 1.0 | " | 0.0472 | 0.0354 | 0.151 | 21 | 43.9 | 4.0 | 930 | 1240 |
| 27 | " | " | " | 2.0 | " | 0.0262 | 0.0196 | 0.084 | 38 | 25.5 | 3.4 | 973 | 1300 |
| 28 | " | " | " | 5.0 | " | 0.0295 | 0.0221 | 0.094 | 34 | 28.4 | 4.8 | 963 | 1290 |
| 29 | " | " | " | 0.5 | 95 | 0.0363 | 0.0272 | 0.116 | 27 | 54.9 | 7.4 | 1510 | 2020 |
| 30 | " | " | " | 1.0 | " | 0.0428 | 0.0321 | 0.137 | 23 | 73.4 | 5.4 | 1710 | 2290 |
| 31 | " | " | " | 2.0 | " | 0.0481 | 0.0361 | 0.154 | 21 | 56.8 | 5.3 | 1180 | 1570 |
| 32 | 2.1 | 4.9 | " | 0.5 | " | 0.0369 | 0.0240 | 0.103 | 31 | 51.8 | 6.0 | 1400 | 2160 |
| 33 | " | " | " | 1.0 | " | 0.0383 | 0.0249 | 0.106 | 30 | 53.7 | 4.6 | 1400 | 2160 |
| 34 | " | " | " | 1.5 | " | 0.0412 | 0.0268 | 0.114 | 28 | 57.9 | 4.5 | 1400 | 2160 |

Notes:
Catalyst samples of runs 25-27 were milled with 400 g of steel balls.
All other catalyst samples were prepared with 300 g of steel balls.

The results presented in Table 3 in runs 24-28 indicate that heat treating the milled invention catalyst at 120° C. is beneficial in increasing catalyst productivity and/or decreasing soluble polymer formation in propylene polymerization compared to a non-heat treated catalyst of the same composition. The best heat treating Propylene was polymerized at 71° C. and the polymer recovered in the process described before. The quantities of reactants employed, calculated values determined, milling conditions employed, run times used, and results obtained are presented in Table 4.

TABLE 4

Propylene Polymerization With Premilling and Heat Treated Catalysts

| | Catalyst Composition Mole % | | | TiCl₃AA Premill Time | Catalyst Ball Mill Time | Catalyst Charged | | | Run Time | Mole Ratio DEAC/TiCl₃AA | Polymer Yield | Soluble Polymer |
|---|---|---|---|---|---|---|---|---|---|---|---|---|
| Run No. | TiCl₃AA/AlCl₃ | TiCl₃AA/TPP | AlCl₃/TPP | Hours | Hours | Total g | Calculated TiCl₃AA g | mmoles | Hours | | g | wt% |
| 35 | 2.6 | 6.2 | 2.3 | 0 | 8.9 | 0.0375 | 0.0263 | 0.112 | 1 | 28 | 54.8 | 6.1 |
| 36 | " | " | " | 0 | 17.6 | 0.0477 | 0.0334 | 0.143 | 1 | 22 | 79.3 | 5.4 |

TABLE 4-continued

Propylene Polymerization With Premilling and Heat Treated Catalysts

| Run No. | | | | | | | | | | | | |
|---|---|---|---|---|---|---|---|---|---|---|---|---|
| 37 | " | " | " | 0 | 26.5 | 0.0397 | 0.0278 | 0.119 | 1 | 27 | 67.6 | 4.0 |
| 38 | " | " | " | 0 | 42.5 | 0.0350 | 0.0245 | 0.105 | 1 | 30 | 53.5 | 7.4 |
| 39 | 2.6 | 6.2 | " | 0 | 26.5 | 0.0460 | 0.0322 | 0.138 | 2.5 | 23 | 141.2 | 7.7 |
| 40 | " | " | " | 2 | 19.1 | 0.0421 | 0.0295 | 0.126 | 1 | 25 | 69.2 | 3.9 |
| 41 | " | " | " | 4 | " | 0.0360 | 0.0252 | 0.108 | 1 | 29 | 58.6 | 5.5 |
| 42 | " | " | " | 2 | " | 0.0473 | 0.0331 | 0.141 | 2.5 | 23 | 155.0 | 7.9 |
| 43 | 3.4 | 7.9 | " | 2 | " | 0.0377 | 0.0283 | 0.121 | 1 | 26 | 65.4 | 6.1 |
| 44 | " | " | " | 4 | " | 0.0390 | 0.0293 | 0.125 | 1 | 25 | 72.5 | 6.2 |
| 45 | " | " | " | 4 | " | 0.0348 | 0.0261 | 0.111 | 2.5 | 29 | 124.6 | 6.2 |

| Run No. | Catalyst Composition Mole % | | | Calculated Productivity, g | |
|---|---|---|---|---|---|
| | $TiCl_3AA$ / $AlCl_3$ | $TiCl_3AA$ / TPP | $AlCl_3$ / TPP | Total Catalyst | Calculated $TiCl_3AA$ |
| 35 | 2.6 | 6.2 | 2.3 | 1460 | 2080 |
| 36 | " | " | " | 1660 | 2370 |
| 37 | " | " | " | 1700 | 2430 |
| 38 | " | " | " | 1530 | 2180 |
| 39 | 2.6 | 6.2 | " | 3070 | 4390 |
| 40 | " | " | " | 1640 | 2350 |
| 41 | " | " | " | 1490 | 2130 |
| 42 | " | " | " | 3280 | 4680 |
| 43 | 3.4 | 7.9 | " | 1730 | 23 |
| 44 | " | " | " | 1860 | 2470 |
| 45 | " | " | " | 3580 | 4780 |

In considering runs 35–38 of Table 4 it can be seen that ball milling times employed in preparing the modified invention catalysts affects catalyst productivity and the amount of soluble polymer formed during the polymerization of propylene. As the milling time is increased from 8.9 hours to 26.5 hours, the productivity based on calculated $TiCl_3AA$ content increased from about 2100 g/g to about 2400 g/g and soluble polymer decreased from about 6 wt% to 4 wt%. On the other hand, at a milling time of 42.5 hours employed in the catalyst of run 38, the productivity based on calculated $TiCl_3AA$ content is about 2200 g/g and the soluble polymer is about 7 wt%. Thus, under the conditions and amounts of materials employed in preparing the catalysts it can be seen that a milling time ranging from about 18–30 hours is preferred. Run 39 results show that another portion of the catalyst employed in run 37 when used in a 2.5 hour polymerization run, produced 4390 g polypropylene/g calculated $TiCl_3AA$ with 7.7 wt% soluble polymer formed. The modified invention catalysts are thus shown to be active for a time in excess of 1 hour in the process used. The catalysts used in runs 40–45 were prepared from $TiCl_3AA$ ball milled prior to forming the modified catalysts. The results are scattered but suggest that premilling $TiCl_3AA$ prior to incorporation with $AlCl_3$ and TPP can improve productivity somewhat and/or decrease soluble polymer formation somewhat, particularly when polymerization times in excess of 1 hour are used. In run 39, productivity is 4390 g/g with 7.7 wt solubles (no premilling) but in in run 42, productivity is 4680 g/g with 7.9 wt% solubles. The best results are exhibited in runs 44 and 45 with the catalyst consisting of 75 wt% $TiCl_3AA$, 12.5 wt% each of $AlCl_3$ and TPP in which the $TiCl_3$ is premilled, the modified catalyst milling time employed is about 19 hours and the milled modified catalyst composition is heat treated for 1 hour at 95° C. The corresponding mole ratios of the catalyst are $TiCl_3AA/AlCl_3$ of 3.4:1, $TiCl_3AA$/TPP of 7.9:1 and $AlCl_3$/TPP of 2.3:1.

I claim:

1. A catalyst which forms on intensively mixing together $TiX_3$, $AlX_3$, and a triaryl phosphite wherein X is halide to form a first milled, dry component which first component is subjected to a heat treatment consisting essentially of raising the temperature of said first component while retaining said first component in the dry state and then combined with a cocatalyst organoaluminum compound of the formula $R_n'AlX_{3-n}$ in which R' is a hydrocarbon group containing from 1 to about 20 carbon atoms, X is a halogen atom and n is an integer of 1 to 3.

2. A catalyst of claim 1 wherein the triaryl phosphite is represented by the formula $(RO)_3P$ where R is aryl, alkyl-substituted aryl, cycloalkyl substituted aryl and aryl-substituted aryl wherein the basic unsubstituted aryl contains 6–14 carbon atoms and the alkyl, cycloalkyl and aryl substituents have 1 to about 10 carbon atoms.

3. A catalyst of claim 1 wherein said $TiCl_3$ is $TiCl_3 \cdot \frac{1}{3}AlCl_3$ formed by reduction of $TiCl_4$ with aluminum.

4. A catalyst of claim 2 wherein said triaryl phosphite is triphenyl phosphite.

5. A catalyst of claim 4 wherein said $AlX_3$ is $AlCl_3$ and said organoaluminum compound is diethylaluminum chloride.

6. A catalyst according to claim 3 wherein the mole ratio of said $TiCl_3 \cdot \frac{1}{3}AlCl_3$ compound to triaryl phosphite is about 4:1 to 25:1 and the mole ratio of $TiCl_3 \cdot \frac{1}{3}AlCl_3$ compound to aluminum trihalide is about 1.5:1 to about 11:1.

7. A catalyst of claim 3 wherein the mole ratio of organoaluminum compound to $TiCl_3 \cdot \frac{1}{3}AlCl_3$ compound is about 1:1 to about 100:1.

8. A catalyst of claim 1 wherein said intensively mixing is ball milling.

9. A method for preparing a catalyst comprising intensively mixing together $TiX_3$, $AlX_3$ and a triaryl phosphite wherein X is halide to form a first milled, dry catalyst composition which first composition is subjected to heat treatment consisting essentially of raising the temperature of said first composition while retaining said first composition in a dry state and then combined with a cocatalyst organoaluminum compound of the formula $R_n'AlX_{3-n}$ in which R' is a hydrocarbon group containing from 1 to about 20 carbon atoms, X is a halogen atom and n is an integer of 1 to 3.

10. A method of claim 8 wherein the triaryl phosphite is represented by the formula $(RO)_3P$ where R is aryl, alkyl-substituted aryl, cycloalkyl substitued aryl and aryl-substituted aryl wherein the basic unsubstituted aryl contains 6–14 carbon atoms.

11. A method of claim 8 wherein said $TiCl_3$ is $TiCl_3 \cdot \frac{1}{3}AlCl_3$ formed by reduction of $TiCl_4$ with aluminum.

12. A method of claim 9 wherein said triaryl phosphite is triphenyl phosphite.

13. A method of claim 11 wherein said $AlX_3$ is $AlCl_3$ and said organoaluminum compound is diethylaluminum chloride.

14. A method of claim 10 wherein the mole ratio of said $TiCl_3 \cdot \frac{1}{3}AlCl_3$ compound to triaryl phosphite is about 4:1 to 25:1 and the mole ratio of $TiCl_3 \cdot \frac{1}{3}AlCl_3$ compound to aluminum trihalide is about 1.5:1 to about 11:1.

15. A method of claim 8 wherein said intensive mixing is ball milling.

16. A method of claim 8 wherein the milled first component of said catalyst is heat treated at a temperature in the range of about 50° to about 120° C. for about 0.1 to about 10 hours.

17. A catalyst of claim 1 wherein said $TiX_3$ is intensively premilled before mixing together with said $AlX_3$ and triaryl phosphite.

18. A method of claim 9 wherein said $TiX_3$ is intensively premilled before mixing together with said $AlX_3$ and triaryl phosphite.

* * * * *